(No Model.)  
2 Sheets—Sheet 1.
M. O. REEVES.
FRICTION CLUTCH.
No. 565,691. Patented Aug. 11, 1896.
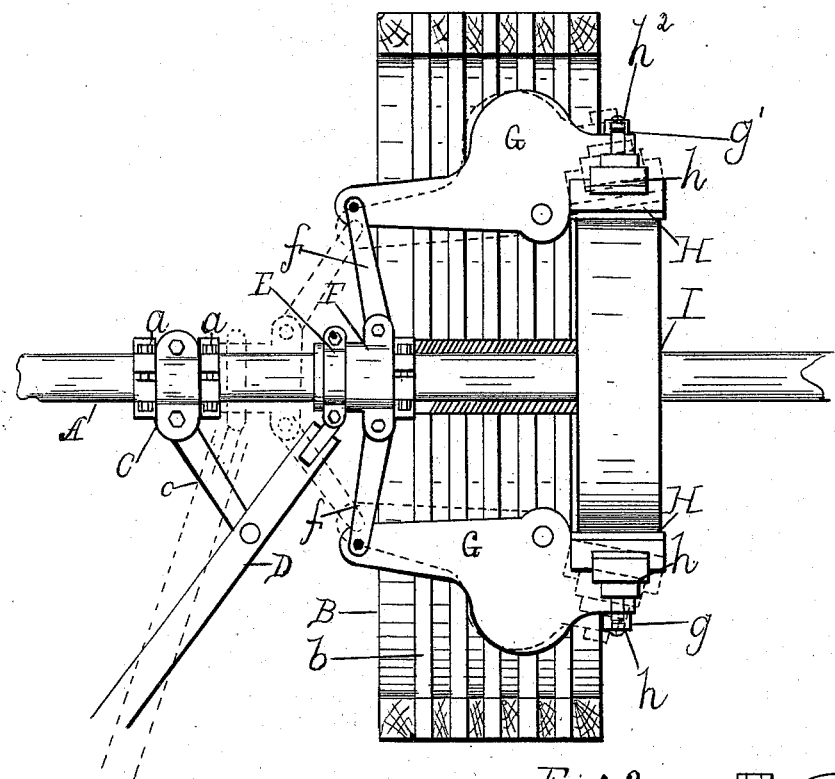
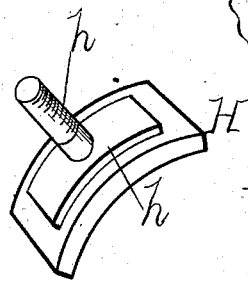
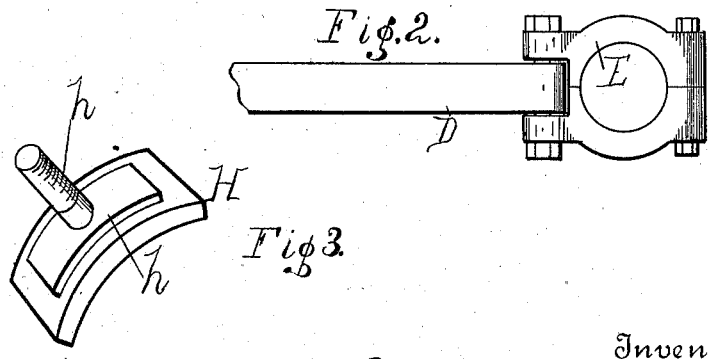
Witnesses  
Ernest K. Hood  
Arthur E. George
Inventor  
Milton O. Reeves,  
By his Attorney  
Geo. B. Parkinson (No Model.) 2 Sheets—Sheet 2.

M. O. REEVES.
FRICTION CLUTCH.

No. 565,691. Patented Aug. 11, 1896.

Witnesses
Ernest K Hood
Arthur E Georgi

Inventor
Milton O. Reeves
By his Attorney
Geo. B. Parkinson.

United States Patent Office.

MILTON O. REEVES, OF COLUMBUS, INDIANA, ASSIGNOR TO THE REEVES PULLEY COMPANY, OF SAME PLACE.

FRICTION-CLUTCH.

SPECIFICATION forming part of Letters Patent No. 565,691, dated August 11, 1896.

Application filed April 3, 1895. Serial No. 544,236. (No model.)

*To all whom it may concern:*

Be it known that I, MILTON O. REEVES, a citizen of the United States of America, residing at Columbus, in the county of Bartholomew and State of Indiana, have invented certain new and useful Improvements in Friction-Clutches for Pulleys, of which the following is a specification.

My invention relates to that class of friction-clutches for pulleys in which friction-shoes adapted to be actuated by a shipping or brake lever engage with a friction-surface carried by the shaft.

The object of my invention is to provide an improved clutch mechanism for split pulleys, and the invention consists in the combination and arrangement of parts hereinafter described and claimed.

I have illustrated my invention as applied to a wooden split pulley with spoke-bars.

Figure 4:
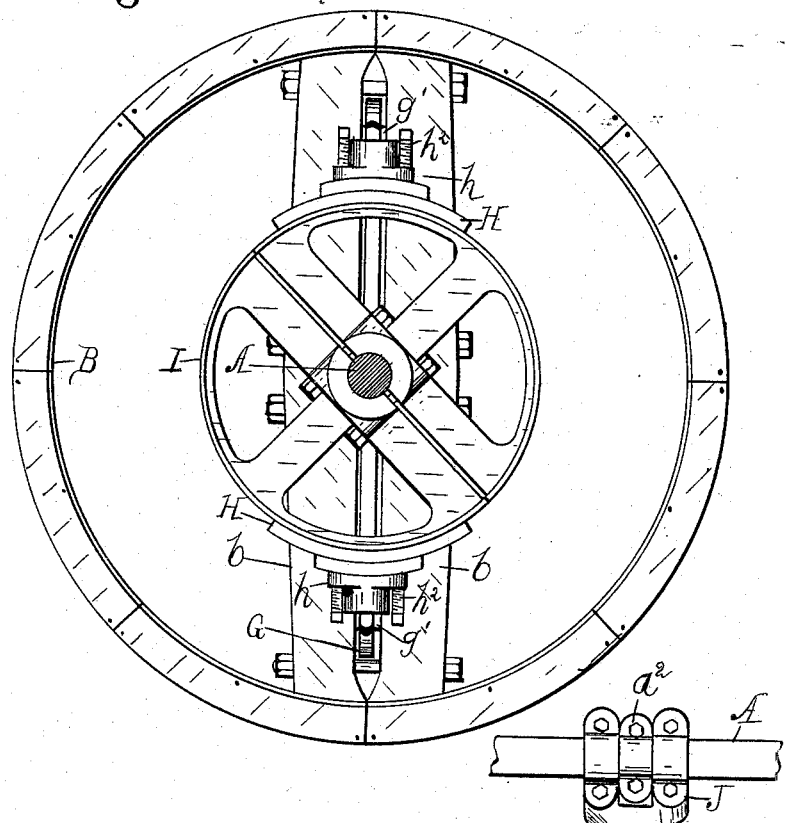
Figure 5:
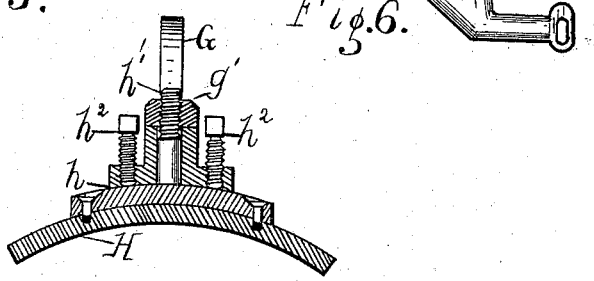

Figure 1 is a view showing the clutch mechanism with a half pulley on the shaft; Fig. 2, an enlarged view of a yoke-strap; Fig. 3, an enlarged perspective of the brake-shoe; Fig. 4, an end elevation of the pulley and clutch mechanism; Fig. 5, an enlarged sectional view of the forward end of the brake-shoe and lever, and Fig. 6 a modified form of brake-lever support.

A represents a shaft, and B a split pulley loosely mounted thereon and having spoke-bars $b$. The meeting ends of the rim of the pulley contact, and a space is left between the spoke-bars of the two parts of the pulley.

C is a collar loosely mounted on the shaft A, between two fixed collars $a\,a$. Pivoted to the collar C is a link $c$, to which is pivoted a shifting-lever D, one end of which is pivoted to a yoke E, which takes into an annular groove in a sleeve F, loosely mounted on the shaft A and free to slide thereon. Pivotally secured to this sliding sleeve are links $f$, the other ends of which are pivotally secured to brake-shoe levers G, pivotally mounted on the spoke-bars of the pulley and adapted to swing in the space between the spoke-bars of the pulley-halves. The free ends of these levers carry shoe-plates $h$, to which are secured brake-shoes H, adapted to bear upon a friction-wheel I, fixed to the shaft A. The shoe-plates are preferably secured to the levers by threaded studs $h'$ and nuts $g'$. Set-screws $h^2$ take through the ends of the levers and bear against the shoe-plates. By turning the nuts $g'$ and the set-screws $h^2$ the shoe-plates may be moved toward or from the friction-wheel and locked in the desired position.

The lengths of the link $c$ and the portion of the shifting-lever between its pivotal connection with the link and the yoke are so proportioned that when the lever is moved into the position shown in full lines in Fig. 1 the brake-shoes will engage with the friction-wheel, thereby locking the pulley to the shaft, and when the lever is thrown into the position shown in dotted lines in Fig. 1 the brake-shoes will be disengaged from the friction-wheel and the pulley freed from rotary engagement with the shaft. When the clutch is in engagement, the brake-shoes are always held parallel to the friction-surface of the wheel, insuring uniform wear on the shoes until worn out.

Figure 6:

In Fig. 6 I have shown a modified form of brake-lever support, in which a Y-yoke J is loosely mounted on the shaft and a tight collar $a^2$ secured to the shaft between the arms of the yoke, so as to prevent movement of the yoke longitudinally upon the shaft. The outer end of the yoke has a slot through which the pivot of the brake-lever passes, and which allows sufficient play of the lever to prevent binding of the sliding sleeve on the shaft.

I claim—

1. The combination with a shaft, of a separable pulley, having diametrical spoke-bars; a separable friction-wheel secured to the shaft, levers pivoted to the spoke-bars adapted to swing between the pulley-halves, and carrying at one end shoes adapted to engage with the friction-wheel, a collar loosely mounted on the shaft, a brake-lever having a link connection with the collar, and connected with and adapted to actuate the sleeve, and links connecting the sleeve and the shoe-carrying levers, substantially as and for the purpose specified.

2. The combination with a shaft, of a separable pulley, having diametrical spoke-bars; a separable friction-wheel secured to the shaft, levers pivoted to the spoke-bars adapted to swing between the pulley-halves, and carrying at one end shoes adapted to engage with the friction-wheel, a collar loosely mounted on the shaft, a brake-lever having a link connected with and adapted to actuate the sleeve, links connecting the sleeve and the shoe-carrying levers and a stop adapted to arrest the engaging movement of the sleeve as the links pass the perpendicular, substantially as and for the purpose specified.

3. The combination with a shaft of a separable pulley, B, having diametrical spoke-bars, $b$; a separable friction-wheel I; levers, G; pivoted to the spoke-bars and carrying friction-shoes, H; a collar C; a brake-lever D, pivoted to link, $c$; a sliding sleeve F; and links, $f$, all arranged to coöperate substantially as and for the purpose set forth.

MILTON O. REEVES.

Witnesses:
JOHN JEWELL,
I. H. REEVES.